2,863,905
RECOVERY AND PURIFICATION OF TRIALKYL PHOSPHITES

Theodor Reetz, Webster Groves, Mo., assignor to Monsanto Chemical Company, St. Louis, Mo., a corporation of Delaware No Drawing. Application June 20, 1956
Serial No. 592,486

5 Claims. (Cl. 260—461)

This invention relates to the recovery and purification of trialkyl phosphites which are normally susceptible to hydrolysis. More particularly this invention relates to the recovery and purification of trialkyl phosphites prepared from a low molecular weight alcohol and a phosphorus trihalide in the presence of ammonia, which trialkyl phosphites are normally susceptible to hydrolysis.

Trialkyl phosphites are generally prepared by reacting a phosphorus trihalide with an alcohol in the presence of an inert organic solvent. As those skilled in the art are well aware the tri-ester so formed is decomposed by the liberated hydrogen halide by-product principally into its acid esters, i. e. the di- and mono-alkyl phosphites, phosphorous acid and an alkyl halide. It has been proposed that anhydrous ammonia be added to the reaction system in various ways in order to bind the hydrogen halide by-product. While the incorporation of anhydrous ammonia in the reaction system materially reduces the amount of decomposition products, the resultant trialkyl phosphite is still contaminated with at least one of the aforementioned impurities and in addition contains ammonium halide and usually other ammonia derivatives. The trialkyl phosphites so prepared, but particularly those normally susceptible to hydrolysis, have been found difficult to purify in an efficient and economical manner. For example, while water may be employed to remove the water-soluble impurities, such causes hydrolysis of the hydrolysis susceptible trialkyl phosphites which, thusly, reduces the yield and increases the recovery problem. Alternatively while the precipitated solids, e. g. the ammonium halide by-product, may be filtered off and the organic residue distilled, in view of the close proximity of the boiling points of the tri-ester and its corresponding acid esters efficient separation is seldom obtained.

It is an object of this invention to provide a convenient, economical and efficient method for recovery and improving the purity of trialkyl phosphites which are normally susceptible to hydrolysis. It is a particular object of this invention to provide a method for improving the recovery and purification of trialkyl phosphites obtained by reacting a phosphorus halide with a $C_{1-3}$ alcohol (e. g. methanol, ethanol, isopropanol and propanol) in the presence of an inert organic solvent and anhydrous ammonia. Further objects will become apparent from the description of the invention which follows.

In accordance with this invention it has been found that the recovery and purification of trialkyl phosphites normally susceptible to hydrolysis prepared from a phosphorus halide and a low molecular weight alcohol (such as a $C_{1-3}$ alcohol) in the presence of an inert organic solvent and anhydrous ammonia can be significantly improved by subjecting the crude reaction mass so obtained to the washing action of an aqueous solution of ammonium carbamate.

The process of this invention is particularly useful in recovery and purification of a crude trialkyl phosphite obtained by reacting a $C_{1-3}$ alcohol, but specifically methanol, and a phosphorus halide in substantially stoichiometric amounts and in the presence of an inert organic solvent while maintaining the reaction system substantially neutral by the addition of anhydrous ammonia, which process is disclosed in U. S. 2,678,940. The crude mass so obtained is a heterogeneous mixture of the desired trialkyl phosphite, dialkyl phosphite, ammonium halide, organic solvent, and usually other impurities. Such a mass upon intimate mixing with an aqueous solution of ammonium carbamate provides an aqueous layer and organic layer, which organic layer in most instances consists of the organic solvent and the trialkyl phosphite. This organic layer upon separation from the aqueous layer followed by fractional distillation provides pure trialkyl phosphite. The amount of trialkyl phosphite recovered is substantially quantitative based upon the amount present in the crude reaction mass.

In order to illustrate this invention a crude trimethyl phosphite (typical of that obtained in accordance with the process disclosed in U. S. 2,678,940 upon reacting phosphorus trichloride and methanol in the stoichiometric amounts necessary to provide trimethyl phosphite in the presence of an inert organic solvent while maintaining the system substantially neutral by the addition of ammonia) consisting essentially of

| | Parts by weight |
|---|---|
| Trimethyl phosphite | 14 |
| Dimethyl phosphite | 4.7 |
| Ammonium chloride | 30 |
| Dichloromethane | 234 | was intimately mixed with an aqueous solution containing 25 parts by weight of ammonium carbamate and 130 parts by weight of water at room temperature. After 15 minutes of mixing substantially 90% of the dimethyl phosphite was destroyed, while after 30 minutes of mixing all of the dimethyl phosphite was destroyed and its decomposition products migrated from the organic layer to the aqueous layer. The organic layer consisted of dichloromethane and trimethyl phosphite. Upon fractionally distilling the organic layer substantially 14 parts by weight of pure trimethyl phosphite was obtained.

Similarly by washing the crude trialkyl phosphite obtained upon reacting in stoichiometric amounts a phosphorus halide and ethanol or propanol or isopropanol in the presence of an inert organic solvent, wherein the system is maintained substantially neutral by the addition of anhydrous ammonia with an aqueous solution of ammonium carbamate, the trialkyl phosphite is recovered in quantitative or substantially quantitative amounts from the crude reaction mass.

While the foregoing illustrates the usage of but one washing of the crude trialkyl phosphite with an aqueous solution of ammonium carbamate, it is to be understood that multiple washings may be employed. Any means of washing well known to those skilled in the art may be employed besides simple mixing, as for example a countercurrent operation, and the like. The concentration of ammonium carbamate may vary widely, however, sufficient ammonium carbamate must be present to destroy the acid esters and sufficient water to dissolve the water-soluble by-products. In general the ammonium carbamate added in the form of an aqueous solution should be that which maintains a pH of about 7 to about 10 throughout the washing operation. The temperature at which the washing operation is conducted may vary widely, however, it must be at least that which provides a fluid medium, but below that which decomposes the trialkyl phosphite. Ordinarily, temperatures in the range of 0° C. to 30° C. are employed.

In the process of this invention it is necessary that the trialkyl phosphite of the crude mass be dissolved in an inert organic solvent prior to the washing operation of this invention. Such inert solvents are well known to those skilled in the art and include, for example, diethyl ether, petroleum ether, methyl chloride, dichloromethane, butane, pentane, hexane, and like water-immiscible or substantially water-immiscible organic liquids. Solvents such as the foregoing are ordinarily employed in preparing trialkyl phosphites from a phosphorus halide and a low molecular weight alcohol.

While this invention has been described with respect to certain embodiments it is not so limited and it is to be understood that modifications and variations obvious to those skilled in the art may be made without departing from the spirit or scope of this invention.

What is claimed is:

1. In a process of preparing trialkyl phosphites normally susceptible to hydrolysis by reacting a low molecular weight alcohol with a phosphorus halide in substantially stoichiometric amounts in the presence of an inert organic solvent while maintaining the reaction system substantially neutral by the addition thereto of anhydrous ammonia, the step which comprises subjecting the crude reaction mass so obtained to the washing action of an aqueous solution of ammonium carbamate.

2. In a process of preparing trimethyl phosphite by reacting methanol with phosphorus trichloride in substantially stoichiometric amounts in the presence of an inert organic solvent while maintaining the reaction system substantially neutral by the addition thereto of anhydrous ammonia, the step which comprises subjecting the crude reaction mass so obtained to the washing action of an aqueous solution of ammonium carbamate.

3. In a process of preparing trimethyl phosphite by reacting methanol with phosphorus trichloride in substantially stoichiometric amounts in the presence of an inert organic solvent while maintaining the reaction system substantially neutral by the addition thereto of anhydrous ammonia, the step which comprises subjecting the crude reaction mass so obtained to the washing action of an aqueous solution of ammonium carbamate, separating the organic layer from the aqueous layer, subjecting the organic layer to a fractional distillation operation, and recovering pure trimethyl phosphite.

4. The process of claim 3 wherein the washing action is conducted at a temperature of 0° C. to 30° C.

5. The process of claim 4 wherein the amount of ammonium carbamate present is sufficient to maintain a pH in the range of about 7 to about 10 throughout the washing operation.

References Cited in the file of this patent

UNITED STATES PATENTS 2,678,940    Boyer et al. _____ May 18, 1954

OTHER REFERENCES

Beilstein: Organische Chemie 3, II, 20 (1910).